W. SMITH.
Assignor by mesne assignments to M. McCullough & J. H. Dalzell.
APPARATUS FOR MAKING PLUMBAGO CRUCIBLES.
No. 7,593. Reissued April 3, 1877.
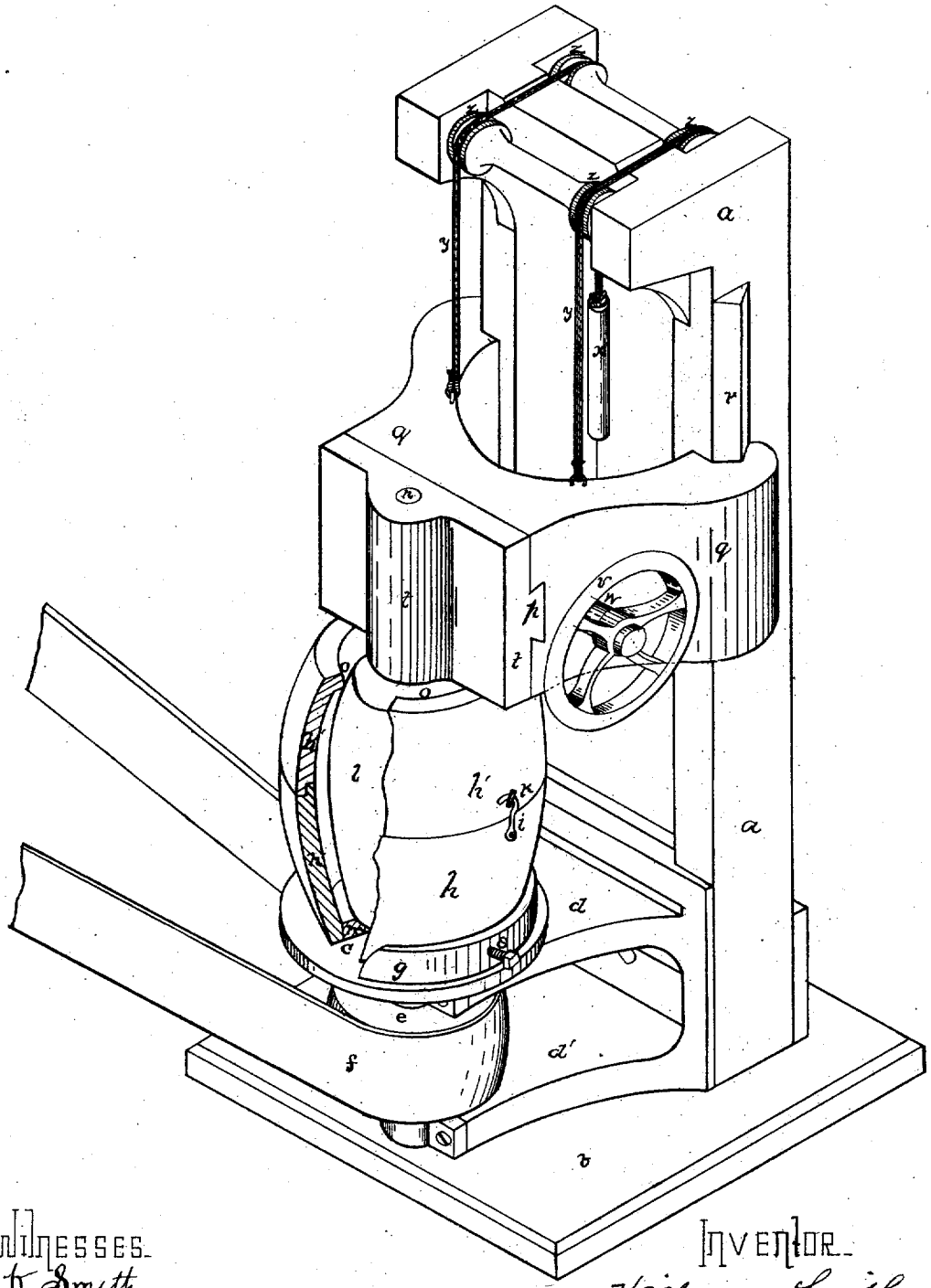
Witnesses.
J. K. Smith
L. C. Fitler.
Inventor.
William Smith
by Bakewell & Kerr
Attys
N. PETERS, PHOTO-LITHOGRAPHER, WASHINGTON, D. C.

UNITED STATES PATENT OFFICE.

WILLIAM SMITH, OF PITTSBURG, PENNSYLVANIA, ASSIGNOR, BY MESNE ASSIGNMENTS, TO M. McCULLOUGH AND JOHN H. DALZELL.

IMPROVEMENT IN APPARATUS FOR MAKING PLUMBAGO CRUCIBLES.

Specification forming part of Letters Patent No. 40,506, dated November 3, 1863; reissue No. 7,593, dated April 3, 1877; application filed March 3, 1877.

*To all whom it may concern:*

Be it known that I, WILLIAM SMITH, of Pittsburg, in the county of Allegheny and State of Pennsylvania, have invented a new and useful Improvement in Apparatus for Making Plumbago Crucibles; and I do hereby declare the following to be a full, clear, and exact description thereof, reference being had to the accompanying drawing, forming a part of this specification, which is a perspective view of my improved machine.

Prior to my invention the ordinary mode of making plumbago crucibles was to draw them up and shape them by hand on a revolving wheel or chuck; but this process is tedious, slow, and expensive, and requires the employment of expert mechanics. By my invention I am enabled to make them in molds by machinery with very great rapidity, and of any required shape, with the utmost exactness, and at the same time secure all the advantages of hand-made crucibles, as the plumbago is worked and drawn up in the mold by means of the former, which presses the plumbago against the sides of the mold.

In my machine, and clearly shown in the drawing, are several valuable and useful features of construction:

First, the former, which, being designed for making bulged crucibles in a bulged mold, has both a vertical and a radial movement, is counterbalanced by means of weights connected therewith by cords passing over pulleys. This enables the operator to raise and lower the former, and to operate it in the mold without arduous labor, and with ease and accuracy.

Second, the former is suspended from a slide, by means of which it is caused to approach and recede from the axis of the mold by a direct horizontal line; and it is operated by a mechanism consisting of a screw-shaft and wheel, by means of which it is caused to bear on the plumbago in the mold with a steady, even pressure, producing crucibles of uniform thickness and finish, very different from such as would be produced were the former guided and operated directly by hand.

Third, the mold, which is designed for bulged crucibles, and hence is partible, and receives the pressure of the mandrel in a direction at right angles to its axis, is secured in the recessed or hollow top of the wheel or chuck, which sustains it against the action of the rib or former.

Fourth, the mold is made without a bottom, the place of which is supplied by a loose plate or disk of wood, or other suitable material, placed upon the wheel on which the crucible is formed. By "loose" I mean not fastened to the mold, wheel, or other part of the machine. This provides for the quick and easy removal of the crucible.

In the manufacture of bulged crucibles it is necessary that the mol l be partible, and that the former be caused to approach the center of the mold as it is withdrawn.—the first in order that the crucible may be removed, and the other to prevent injury to the contracted mouth of the crucible by the former as it is being withdrawn.

In the drawing, *a* is the upright frame of my machine, and *b* the bed-plate. The horizontal disk, wheel, or chuck *c* is mounted on a vertical shaft, which revolves in bearings in the horizontal brackets *d d'*, the lower one of which, *d'*, rests on the bed-plate *b*. Between the brackets *d d'*, and attached to the shaft of the wheel *c*, is a pulley, *e*, which is caused to revolve rapidly by means of a belt, *f*, or otherwise, as may be convenient. Near the circumference of the wheel or chuck *c* is a circular flange, *g*, forming a recessed or hollow top for the reception of the mold. The latter is held in place centrally on the wheel by means of the set-screws *s*. (One set-screw only is seen in the drawing, the other being diametrically opposite to it.) The mold *h* is made of any desired shape; but if the crucible is designed to be of greater diameter in the middle than at the top and bottom, as is the case with crucibles employed in the manufacture of steel, (which is by far the larger proportion,) the mold is parted horizontally at the point where the width or diameter of the crucible is greatest. The upper section *h'*, in such case, is attached to the lower section by hooks *i*, in one section passing over a pin, *k*, or through an eye in the other, there being a rabbet or lap at the joint of the two sections $h$ and $h'$ of the mold to insure an exact fit.

The mold is made open at the top, of course, and it has no bottom, the place of which is supplied by a circular plate or disk of metal or wood, $m$, which is set on the wheel $e$, and which fits in the mold at its lower end.

A former, $l$, which revolves on its axis on a vertical spindle, $n$, serves to work the plumbago inside of the mold and draws it upward, at the same time giving to the inside of the crucible the shape desired. The curve of the former is that required to be given to the interior of the crucible, but its diameter is less than that of the cavity of the crucible, so that it may be drawn up out of the mold when the crucible is finished. The length of the former is equal to the inside height of the crucible. The spindle $n$ to which the former $l$ is attached, and on which it revolves, is rigidly attached to, or suspended from, the face plate of the sliding bracket $q$, which projects horizontally from the upright frame $a$ of the machine and slides up and down on V-slides $r\ r$ on the sides of the frame.

The bracket $q$ is in two parts, it having a sliding face-plate, $t$, which is attached to the projecting extremity of the bracket by a dovetailed tenon, $p$, working in a corresponding mortise in the bracket, by means of which the face-plate can be moved horizontally on the bracket $q$, thereby causing the former $l$ to travel toward and from the center of the mold by a direct horizontal line. This motion is given by means of a hand-wheel, $v$, attached to the screw-shaft $w$, which works in the bracket $q$, the screw-threads working in a female screw cut in a tongue which projects inward from the face-plate $t$ into a recess in the end of the bracket $q$. This mechanism enables me to operate the former by a steady, even movement, and prevents its wabbling under the pressure of the batch as it is worked up against the side of the swiftly-revolving mold.

The sliding bracket $q$ is counterpoised by two weights, $x\ x$, (one of which is shown by the drawing,) at the end of the ropes $y\ y$, which pass over pulleys $z\ z$ at the top of the frame $a$, and are fastened to the bracket $q$, from which the former is suspended. It is evident that the counterweighting of the former relieves the operator greatly. He is thereby enabled to raise of it out of the mold with ease, and, in lowering it into the mold, does not have to sustain its weight; and, in directing its movements in the mold, does not have to counteract or overcome its momentum to prevent its injuring the crucible or mold.

Having thus described the construction of my apparatus for making crucibles, I will briefly explain the mode of operating it.

The batch from which the crucibles are made is composed of pulverized graphite or plumbago, mixed with a suitable proportion of fire-clay, and formed into a dough with water, in the ordinary way.

A lump of this batch of sufficient quantity to form the crucible is placed in the bottom of the mold, the upper and lower sections of which are united and secured to the wheel, as described, the circular plate or false bottom $m$ being in its place and the bracket $q$ being raised, so as to lift the former $l$ entirely out of the mold before the batch is inserted.

The wheel $c$ is then rapidly revolved, which causes the mold also to turn on its axis, which is coincident with the axis of the wheel-shaft and center of the wheel $c$. The slide $t$ of the bracket $q$ is then set so that the axis of the shaft of the former is vertically over the mouth of the mold and in the same axial line therewith, which is done by means of the hand-wheel $v$. The bracket $q$ is then lowered, and the former $l$ is pressed down into the plumbago batch in the mold, the downward movement of the bracket and the length of the former being such that when the bracket $q$ is pressed down as far as it will go, the lower extremity of the former $l$ will be distant from the surface of the false bottom $m$ of the mold the thickness which is required for the bottom of the crucible.

The insertion of the lower end of the former $l$ into the plumbago batch forces it up between the former and the inside of the revolving mold, the batch being in a plastic condition. The hand-wheel $v$ is then gradually turned, which moves the slide $t$, and with it the former $l$ to one side, thereby pressing the batch sidewise, reducing its thickness, and forcing it to rise uniformly all around the revolving mold until it overflows at the top, if there be an excess of batch in the mold. This side motion of the former, which is on a direct radial line from the center of the mold, is continued until the former encounters the flange $o$, which projects inward toward the center, beyond the inner surface of the mold a distance equal to the required thickness of the crucible. This flange $o$ operates as a stop to gage the thickness of the crucible. When the surface of the former comes in contact with the projecting rim $o$, the overflow of the plumbago is thereby cut off, and the crucible is finished.

If it is desired to make the crucibles of the same thickness throughout, the curve of the working face of the former $l$ is made exactly similar to that of the inside of the mold, allowing for the relative distance of the curves from the centers of curvature; but if the thickness of the crucible is desired to be greater at one point than another the curve of the face of the former $l$ differs accordingly from that of the inner face of the mold.

As the former revolves on its spindle $n$ by contact with the plumbago batch there is no rubbing on the inside of the crucible, but a smooth and regular surface is obtained. The pressure being gradually applied and operating to draw up the batch between the pressing-surfaces makes the crucible without seams or faults, and is, therefore, greatly preferable to the process of molding by direct pressure between two non-revolving surfaces.

When the crucible is formed the former *l* is drawn back to the center of the mold, and elevated out of it by throwing up the bracket *q*. The hooks *i* of the mold are loosened, the upper section lifted off, and the lower section being removed from the wheel *c* by loosening the set-screws *s*, the finished crucible is removed, dried, and annealed in the usual way. The false bottom, by preventing adhesion to the bottom of the mold, renders the crucible more easy of removal.

By my machine a crucible may be made in two or three minutes.

What I claim as my invention, and desire to secure by Letters Patent, is—

1. In a crucible-machine, a counterpoised former, having both a vertical and a radial movement in a bulged mold for forming bulged crucibles, in combination with the mold, substantially as described.

2. In a crucible-machine, the former mounted or dependent on a sliding carrier, provided with suitable means for moving it to and from the side of the mold, substantially as described.

3. A partible removable mold, open at both ends, having a loose bottom, upon which the crucible is made, substantially as described.

4. A partible bulged mold, in combination with a hollow or recessed wheel or chuck, which receives and sustains the same under the operation of the former, which has a radial movement in the mold, and bears against one side, substantially as described.

5. The hollow or recessed wheel, provided with means for fastening the mold therein, substantially as described.

In witness whereof I, the said WILLIAM SMITH, have hereunto set my hand.

WILLIAM SMITH.

Witnesses:

JOHN D. MORELAND,
T. B. KENS.